Jan. 19, 1943.  J. C. McQUERRY  2,308,820
ARMORED SHIP CONSTRUCTION
Filed March 10, 1942  2 Sheets-Sheet 1
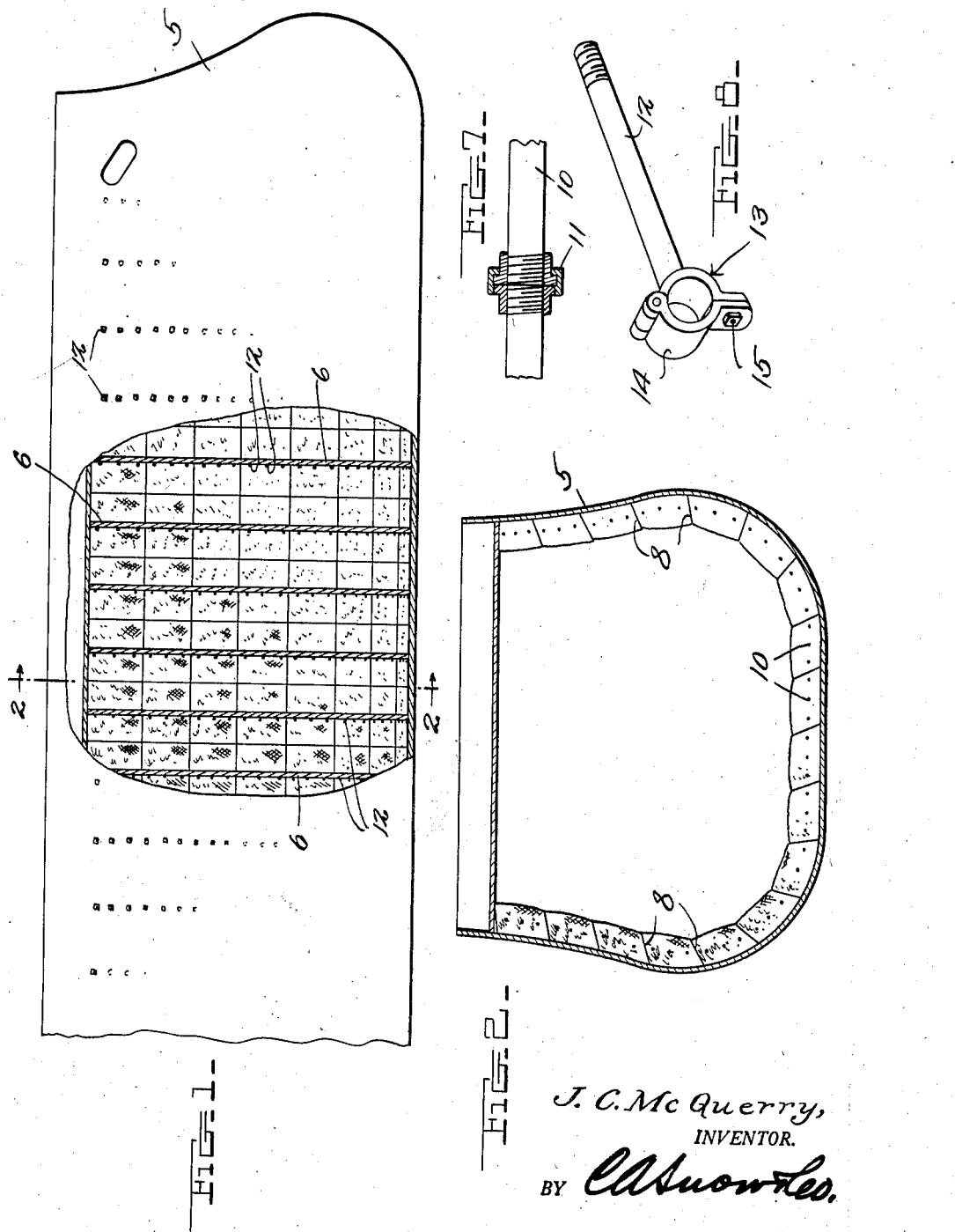
J. C. McQuerry,
INVENTOR.
BY CHSnowles Jan. 19, 1943. J. C. McQUERRY 2,308,820
ARMORED SHIP CONSTRUCTION
Filed March 10, 1942 2 Sheets-Sheet 2
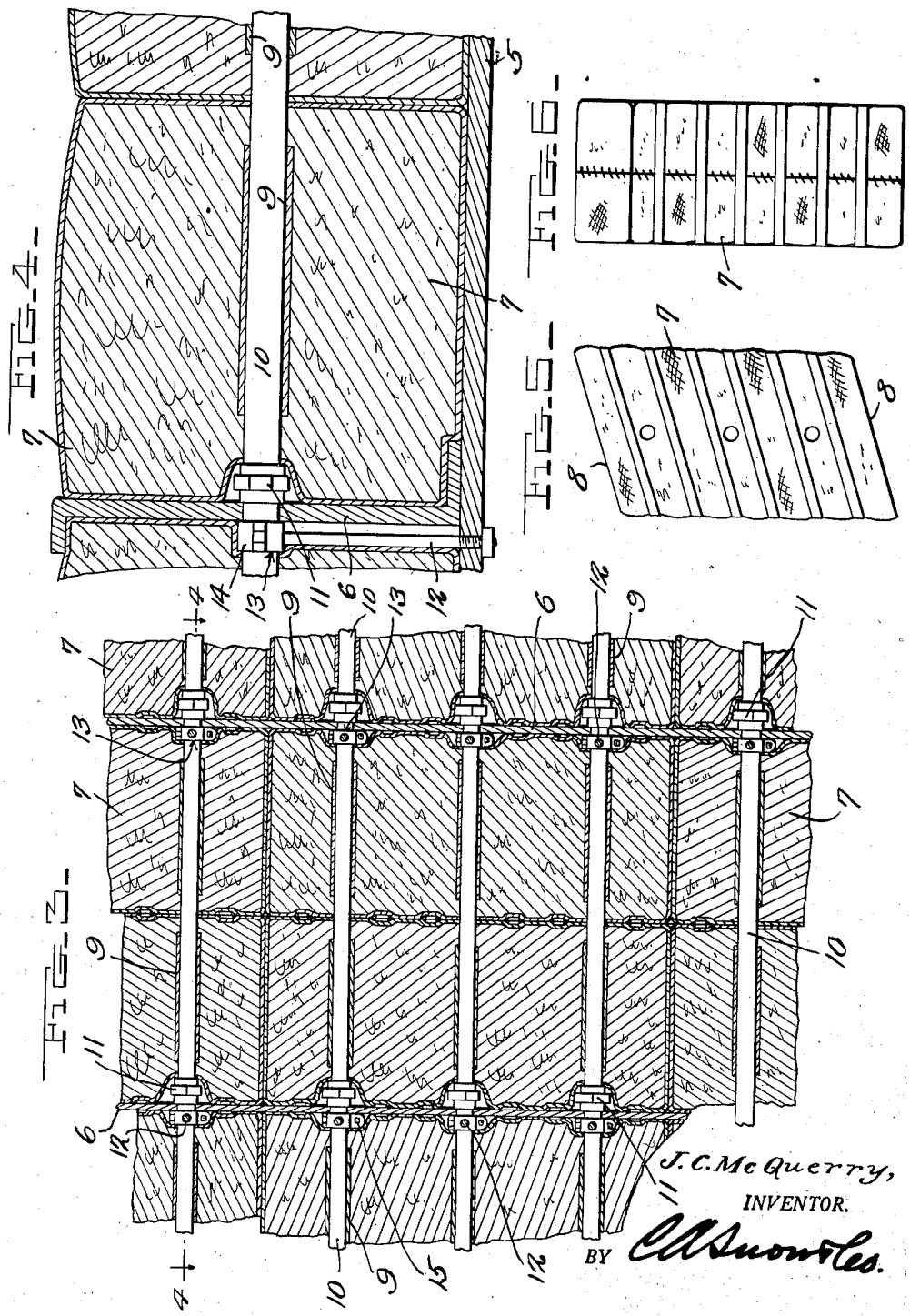
J. C. McQuerry,
INVENTOR.

Patented Jan. 19, 1943

2,308,820

UNITED STATES PATENT OFFICE 2,308,820

ARMORED SHIP CONSTRUCTION

James C. McQuerry, Wichita Falls, Tex.

Application March 10, 1942, Serial No. 434,105

3 Claims. (Cl. 114—69)

This invention relates to armored ships, the primary object of the invention being to provide an armor for ships, constructed of bales of cotton which will have the effect of cushioning the impact of a torpedo or shell striking the hull of the ship.

An important object of the invention is to provide means whereby the bales of cotton will be securely held positioned within the hull of the ship, but at the same time the securing means may be readily and easily removed should it become necessary to remove and replace damaged bales, during the repair of the hull of the ship.

Another object of the invention is to provide a securing means for the bales, so that the undamaged bales of a hull may be removed readily, should the ship be badly damaged on the interior by fire.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings

Figure 1 is a fragmental elevational view of the hull of a ship, a portion of the outer shell of the hull having been broken away illustrating the bales of cotton arranged between the ribs and shells of the hull.

Figure 2 is a sectional view taken on line 2—2 of Figure 1.

Figure 3 is a fragmental sectional view through the bales of cotton when positioned within the hull of a ship for armoring purposes.

Figure 4 is a sectional view taken on line 4—4 of Figure 3.

Figure 5 is an elevational view of one of the bales of cotton used in armoring the ship, and illustrating the novel construction of the bales.

Figure 6 is a side elevational view of one of the bales.

Figure 7 is a view illustrating the method of connecting the tie-rods employed in tying the bales together.

Figure 8 is a perspective view of one of the securing rods that cooperate with the tie-rods in securing the bales of cotton within the hull.

It is only possible to form these bales of cotton by means of a specially prepared gin press, that presses the cotton around the tubes that receive the body bolts, and gives the bales bevel ends to lap together.

Referring to the drawings in detail, the reference character 5 designates the outer shell of the hull of a ship, and the reference character 6 designates the usual spaced ribs over which the outer shell is constructed. As shown, these ribs are arranged in spaced relation with respect to each other, the space between adjacent ribs being equal to the combined width of the bales of cotton supported therebetween, to the end that the bales of cotton will be securely held between the adjacent ribs.

The reference character 7 designates the bales of cotton, and as shown by Figure 5 of the drawings, these bales of cotton are especially constructed so that when properly positioned one upon another, the inclined upper and lower ends 8 thereof will cooperate in holding the bales against slippage with respect to each other.

Tubes indicated at 9 are embedded in the bales of cotton, the tubes being designed to receive the tie-rods 10 which have their ends secured together, by means of the nipples 11. These tie-rods 10 also extend through openings in the ribs, which are arranged so that the tubes of the bales of cotton, aline with the openings, to receive the tie-rods.

In order that the bales of cotton will be securely held to the inner surface of the outer shell of the hull of the ship, supporting rods 12 are provided, the supporting rods having threaded ends that extend through the outer shell of the hull, where they are supplied with nuts. The inner ends of the supporting rods 12 are formed with eye members 13. Each eye member comprises a lower stationary part and a hinged section 14 adapted to swing over the tie-rod with which it is used, and be bolted in such position, by means of a bolt 15. Thus it will be seen that due to this construction, should it be desired to remove one or more bales of cotton for purposes of repair, the sections 14 of the supporting bolts adjacent to the portion of the hull to be repaired, may be swung outwardly, releasing the tie-rods secured thereby. The nipples connecting the adjacent ends of the tie-rods, may now be loosened and the damaged bales readily removed and replaced by perfect or undamaged bales of cotton.

It might be further stated that the bales of cotton are formed in the usual and well known manner, the cotton being packed into bales and covered by a piece of fabric or other suitable material.

When bales are firmly bolted to the hull of the ship, and bales are tightly drawn together, the ties are cut or unbuckled, and a solid three inch steel floor covering the cotton on the outside welded, air tight and waterproof, making a complete smooth surface for the ship both side walls and bottom.

This same construction can be used to protect the top of ships, trains, buildings of all kinds, including bomb shelters all protected from torpedos, aerial bombs, mines and other explosions. Fireproof cotton can be used.

What is claimed is:

1. In an armored ship, a hull comprising an outer shell, spaced ribs secured to the outer shell, said ribs having openings formed therein, bales of cotton positioned in rows between the ribs, tubes embedded in the bales, said tubes adapted to aline with the openings of the ribs, tie-rods extending through the openings of the ribs and tubes, securing the bales together, and securing rods extending through the hull of the ship and having eyes adapted to receive said tie-rods, securing the tie-rods and bales in position between said ribs.

2. In an armored ship, a hull comprising an outer shell, spaced ribs secured within the shell, said ribs having openings formed therein, bales of cotton closely fitted between the ribs, tubular members within the bales of cotton and extending transversely therethrough, said tubular members adapted to register with the openings in the ribs, tie-rods extending through the openings of the ribs and being extended through the tubular members, means for securing the ends of the tie rods together, securing the bales against lateral movement between adjacent ribs, and securing rods having eyes adapted to accommodate the tie-rods, securing the tie rods to the outer shell.

3. In an armored ship, a hull comprising an outer shell, spaced ribs extending in parallel relation with each other throughout the width of the shell, said ribs having openings formed therein, bales of cotton closely fitted between the ribs, tubular members within the bales of cotton, said tubular members of adjacent bales of cotton adapted to register with each other and adapted to align with the openings in the ribs, tie-rods extending through the openings of the ribs and tubular members, securing the bales of cotton in position, securing rods extending through the shell, removable clamping means at the inner ends of the securing rods adapted to clamp the tie-rods, securing the tie-rods and bales against movement.

JAMES C. McQUERRY.